US009854157B1

(12) United States Patent
Asuncion

(10) Patent No.: US 9,854,157 B1
(45) Date of Patent: Dec. 26, 2017

(54) CAMERA WITH TOUCH SENSOR INTEGRATED WITH LENS WINDOW

(71) Applicant: GoPro, Inc., San Mateo, CA (US)

(72) Inventor: Bryan Asuncion, San Jose, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/285,475

(22) Filed: Oct. 4, 2016

(51) Int. Cl.
*H04N 5/232* (2006.01)
*H04N 5/225* (2006.01)
*G06F 3/0354* (2013.01)
*G06F 3/0346* (2013.01)
*G06F 3/0488* (2013.01)

(52) U.S. Cl.
CPC ....... *H04N 5/23216* (2013.01); *G06F 3/0346* (2013.01); *G06F 3/03547* (2013.01); *H04N 5/2254* (2013.01); *H04N 5/2258* (2013.01); *H04N 5/23238* (2013.01); *H04N 5/23293* (2013.01); *G06F 3/04883* (2013.01)

(58) Field of Classification Search
CPC ............. H04N 5/23216; H04N 5/2254; H04N 5/2258; H04N 5/23238; H04N 5/23293; G06F 3/0346; G06F 3/03547; G06F 3/04883
See application file for complete search history.

(56) References Cited

U.S. PATENT DOCUMENTS

| 2011/0267530 | A1* | 11/2011 | Chun ................. G06F 3/04883 348/333.11 |
| 2016/0309069 | A1* | 10/2016 | Steinberg ............. H04N 5/2256 |
| 2016/0309076 | A1* | 10/2016 | Steinberg ........... H04N 5/23216 |

* cited by examiner

Primary Examiner — Tuan Ho
(74) Attorney, Agent, or Firm — Fenwick & West LLP

(57) ABSTRACT

A camera comprises a camera body, an image sensor internal to the camera body for capturing images, a lens assembly, a display screen on an external face of the camera body, and a touch controller. The lens assembly comprises one or more lens elements to direct light to the image sensor. The one or more lens elements includes a lens window on the external face of the camera body that comprises a transparent integrated touch sensor to detect a position of a touch on the lens window and to generate a touch signal indicating the position of the touch. The touch controller processes the touch signal and updates a display on the display screen in response to the touch signal.

20 Claims, 4 Drawing Sheets

CAMERA WITH TOUCH SENSOR INTEGRATED WITH LENS WINDOW

BACKGROUND

Technical Field

This disclosure relates to a camera, and more specifically, to a touch sensor in a camera.

Description of the Related Art

As cameras become increasingly more sophisticated, a well-designed user interface becomes increasingly more important to enable a user to efficiently access and control various camera features. Traditional button-based user interfaces often either require a large number of buttons that make the cameras physically larger and more expensive to build, or are not intuitive to use because a limited number of buttons are available to access a large number of features. Touch screen interfaces can be intuitive to use, but space for such interfaces becomes limiting as cameras become more compact.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A camera comprises a lens assembly with an integrated touch sensor that enables a user to control a user interface displayed on a display screen adjacent to a lens window of the lens assembly. For a compact form factor camera having a display screen adjacent to the lens window, the lens window represents a convenient location to integrate the touch sensor. Such an embodiment beneficially enables the user to intuitively navigate the user interface on the adjacent display screen. Particularly, in a dual-lens camera for capturing very wide angle or spherical content having respective lens assemblies facing in opposite directions on each side of the camera, it may be impractical to include a separate independent touch sensor and still maintain a sufficiently small for factor.

In a particular embodiment, a camera comprises a camera body, an image sensor internal to the camera body for capturing images, a lens assembly, a display screen on an external face of the camera body, and a touch controller. The lens assembly comprises one or more lens elements to direct light to the image sensor. The one or more lens elements includes a lens window on the external face of the camera body that comprises a transparent integrated touch sensor to detect a position of a touch on the lens window and to generate a touch signal indicating the position of the touch. The touch controller processes the touch signal and updates a display on the display screen in response to the touch signal.

Example Camera Architecture

Figure 1:
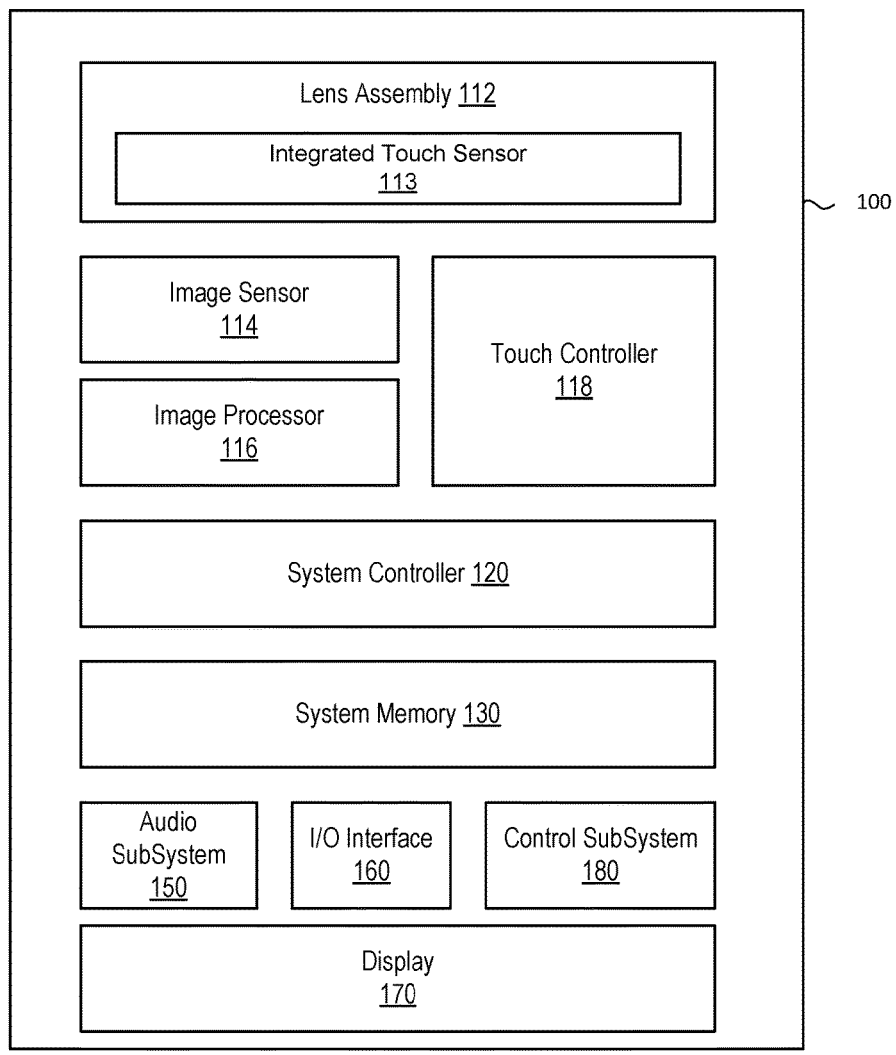
FIG. 1 is a block diagram illustrating an example embodiment of a camera architecture having a lens assembly with an integrated touch sensor.

FIG. 1 illustrates a block diagram of an example camera 100. In an embodiment, the camera 100 comprises a lens assembly 112 with an integrated touch sensor 113, an image sensor 114, an image processor 116, a touch controller 118, a system controller 420, system memory 130, an audio subsystem 150, an input/output (I/O) interface 160, a control sub-system 180, and a display 170. The system controller 120 may comprise, for example, a microcontroller or microprocessor that controls the general operation and functionality of the camera 100. The system memory 130 stores executable computer instructions that, when executed by the system controller 120 and/or the image processors 116, perform the camera functionalities described herein. Additionally, the system memory 130 may temporarily or persistently store image data, sensor data, control data, or other data used by the camera 100 to carry out the functions described herein.

The lens assembly 112 can comprise, for example, a wide angle lens, hemispherical, or hyper hemispherical lens that focuses light entering the lens to the image sensor 114 which captures images and/or video frames. The image sensor 114 may capture high-definition images suitable for video having resolutions of, for example, 720p, 1080p, 4k, or higher. Furthermore, the image sensor 114 may capture video at frame rates of, for example, 30 frames per second, 60 frames per second, or higher. The image processor 116 performs one or more image processing functions of the captured images or video. For example, the image processor 116 may perform a Bayer transformation, demosaicing, noise reduction, image sharpening, image stabilization, rolling shutter artifact reduction, color space conversion, compression, or other in-camera processing functions. Processed images and video may be temporarily or persistently stored to system memory 130 and/or to a non-volatile storage, which may be in the form of internal storage or an external memory card.

The input/output (I/O) interface 160 may transmit and receive data from various external devices. For example, the I/O interface 160 may facilitate the receiving or transmitting video or audio information through an I/O port. Examples of I/O ports or interfaces include USB ports, HDMI ports, Ethernet ports, audio ports, and the like. Furthermore, embodiments of the I/O interface 160 may include wireless ports that can accommodate wireless connections. Examples of wireless ports include Bluetooth, Wireless USB, Near Field Communication (NFC), and the like. The I/O interface 160 may also include an interface to synchronize the camera 100 with other cameras or with other external devices, such as a remote control, a second camera, a smartphone, a client device, or a video server.

The audio subsystem 150 may include, for example, one or more microphones and one or more audio processors to capture and process audio data correlated with video capture. In one embodiment, the audio subsystem 150 may include a microphone array having two or microphones arranged to obtain directional audio signals.

The display 170 comprises, for example, a liquid crystal display (LCD) or light emitting diode (LED) display panel that displays various data useful for operating the camera. For example, the display 170 may display menus for configuring various user-configurable settings of the camera such as, for example, a power state of the camera, a capture mode of the camera (e.g., video, single image, time lapse image, or burst image) resolution, frame rate, aspect ratio, or other camera settings.

The integrated touch sensor 113 comprises a device integrated with the lens assembly 112 that can detect when a user touches the lens assembly 112 and may also detect a position of the touch. For example, in an embodiment, the integrated touch sensor 113 may comprise a capacitive touch sensor that detects a touch based on capacitive coupling. The integrated touch sensor 113 may be implemented on a flexible and transparent material that may conform to the outermost lens element (e.g., a lens window) or may itself act as the outermost lens element. In an embodiment, the integrated touch sensor 113 comprises a matrix of touch pixels comprising electrodes that individually sense a touch at their respective locations. For example, in an embodiment, the integrated touch sensor 113 may comprise a mutual capacitance touch sensor in which the object (e.g., a finger or stylus) alters the mutual coupling between row and column electrodes that are sequentially scanned. In another embodiment, the integrated touch sensor 113 may comprise a self-capacitance touch sensor in which the object (e.g., a finger or stylus) increases a parasitic capacitance at a particular position on the touch sensor that can be detected. The integrated touch sensor 113 may output a touch sense signal that indicates coordinates of a touch when it occurs. In one embodiment, the integrated touch sensor 113 comprises a multi-touch sensor that can sense a touch at multiple different locations simultaneously and encode the respective coordinates in the touch sense signals. This enables, for example, the integrated touch sensor 113 to detect multi-point gestures.

The touch controller 118 receives the touch sense signal from the integrated touch sensor 113 and processes the received signal to determine whether a touch occurred at a particular time and the coordinates of the touch if it occurred. For example, the touch controller 118 may apply an algorithm to determine whether a touch sense signal actually represents a touch or is a false positive (e.g., by applying some noise filtering). Additionally, the touch controller 118 may process the touch sense signal to detect a type of gesture such as, for example, a single tap, a double tap, a single finger swipe, a double finger swipe, a triple finger swipe, a pinch-in, a pinch-out, or other type of gesture.

The touch controller 118 may generate control information to update the display 170 based on the touch sense signal. For example, the touch controller 118 may update the display to indicate selection of a menu option, to move a cursor location, to change to a different menu screen, or to indicate other interactions with the user interface.

Since the integrated touch sensor 113 is integrated with the lens assembly 112, it may be intended for use only when the camera is not actively capturing images or video. Thus, in an embodiment, a separate control subsystem 180 that does not depend on the integrated touch sensor 113 may be included to enable the user to control actions of the camera during or immediately before or after image or video capture. For example, the control subsystem 180 may comprise a shutter button to enable the user to initiate capture of an image or video or to stop capture of video. Additionally, the control subsystem 180 may include a settings button to change certain video settings that the user may desire to control during video capture (e.g., changing frame rate mid-capture to enable a slow motion video replay).

In some embodiments, a camera 100 may include multiple lens assemblies 112 that may each have a corresponding image sensor 114, image processor 116, and touch controller 118. For example, in one embodiment, a camera 100 comprises two lens assemblies 112 to capture respective fields of view in different directions which may then be stitched together to form a cohesive image. In one such embodiment, the camera 100 may include two lens assemblies 112 each having a hemispherical or hyper hemispherical lens that each captures a hemispherical or hyper hemispherical field of view. In such configurations, either one or both of the lens assemblies 112 may include the integrated touch sensor 113. Furthermore, the camera 100 may include two displays 170, each adjacent to one of the lenses, or may include only a single display 170.

Figure 2A:
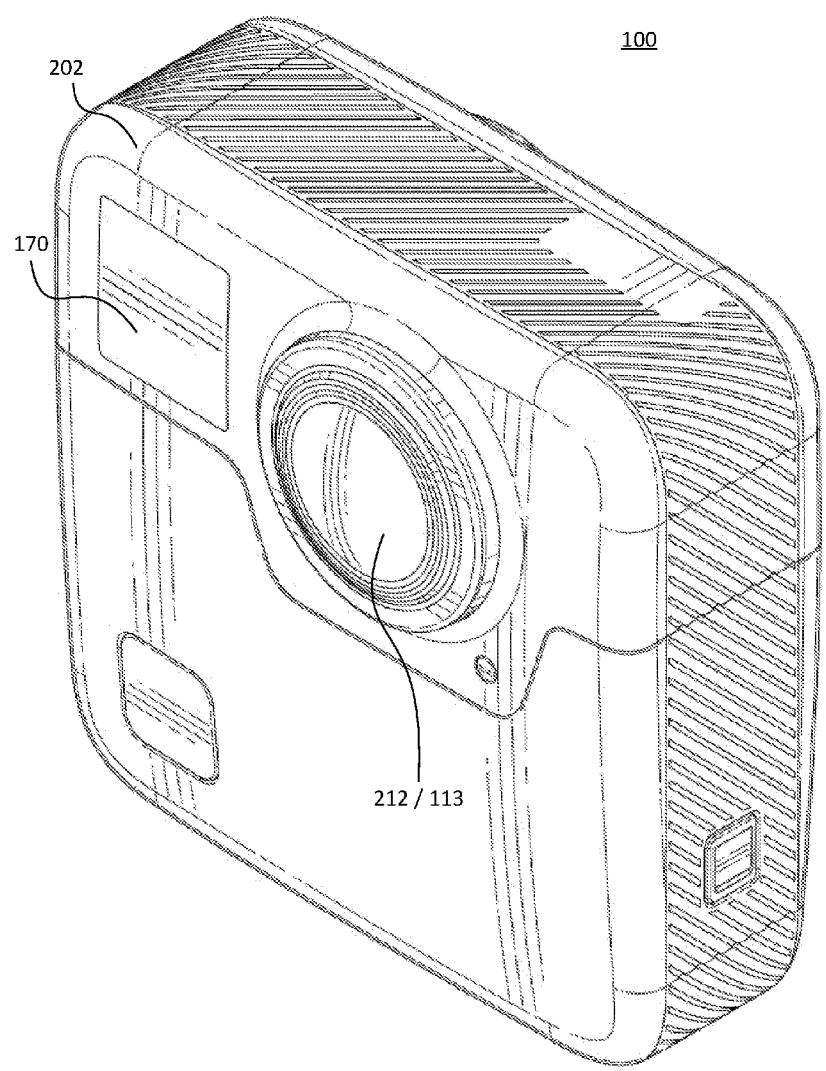
FIG. 2A is a block diagram illustrating a first perspective view of an example embodiment of a camera having a lens assembly with an integrated touch sensor.

FIG. 2A illustrates a first perspective view of an example embodiment of the camera 100 that comprises a camera body 202, a display 170, and a lens window 212 representing an outermost lens element of the lens assembly 112 with an integrated touch sensor 113. In the illustrated embodiment, the display 170 comprises approximately the same area as the surface of the lens window 212 (e.g., the area of the display 170 is between 0.5 and 1.5 times the area of the surface of the lens window 212) and is positioned adjacent to the lens window 212. For example, in one embodiment, the display 170 comprises a plurality of pixels arranged in a display matrix having a display matrix length and a display matrix width, and the integrated touch sensor 113 comprises a plurality of detectable touch coordinates arranged in a touch matrix having a corresponding touch matrix length and a touch matrix width approximately equal to the display matrix length and width. The relative sizes and positions of the lens window 212 and the display 170 results in a user-friendly interface because the touch sensor 113 is directly next to the display 170 and the user can easily and intuitively control the user interface on the display 170 via the touch sensor 113. In an embodiment, in which the lens window 212 is substantially circular and the display 170 is substantially rectangular, a pixel mapping may be applied to map a pixel position on the circular lens window to a corresponding pixel position on the rectangular display.

By integrating the touch sensor 113 with the lens window 212 (instead of, for example, having a separate independent touch sensor), the camera 100 can beneficially have a more compact form factor and does not require extra area to be available on the camera body 202 for a separate touch sensor. Additionally, a touch sensor placed on a different surface of the camera body 202 has a disadvantage of the user being likely to inadvertently touch the touch sensor while holding the camera during use, and thus settings of the camera 100 may be unintentionally changed. Since the camera 100 is inherently designed with a form factor that allows for the user to avoid touching the lens window 212 while capturing image or video (and thus obstructing the view), integrating the touch sensor 113 with the lens window 212 results in the touch sensor 113 being in a position that is unlikely to be inadvertently touched.

In one embodiment, the lens window 212 is coated with an anti-smudge and anti-scratch coating to prevent the touching of the lens from leaving marks that may impact image or video quality.

Figure 2B:
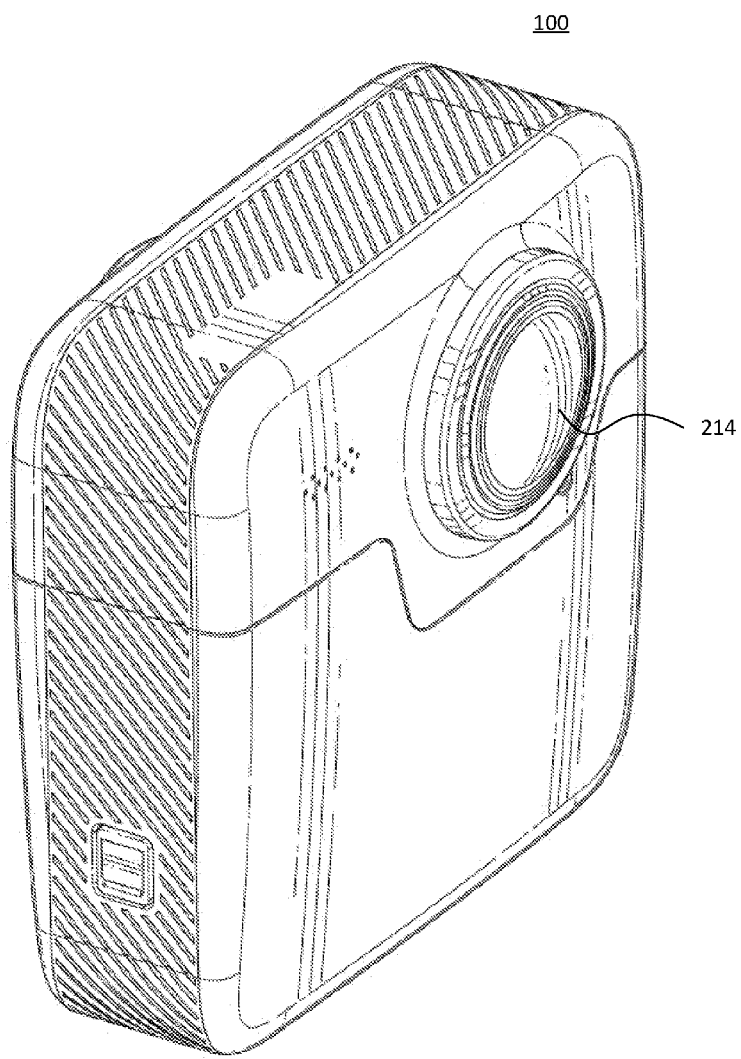
FIG. 2B is a block diagram illustrating a second perspective view of an example embodiment of a camera having a lens assembly with an integrated touch sensor.

FIG. 2B illustrates a second perspective view of the example camera 100 of FIG. 2A. As illustrated in FIGS. 2A-2B, the camera 100 includes two lens assemblies 112 (e.g., a first hemispherical or hyper-hemispherical lens and a second hemispherical or hyper-hemispherical lens) with respective lens windows 212, 312 on opposite sides of the camera body 202 that enables the camera 100 to capture spherical image or video content when the images from the two lenses are stitched together. In one such embodiment, the display 170 is on only one side of the camera body 202 and is adjacent to a lens window 212 with an integrated touch sensor 113. The other side of the camera body 220 may not have the display 170 and may have a lens window 312 that lacks the integrated touch sensor 113. In yet other embodiments, both sides of the camera 100 may include displays 170 and the corresponding lens windows 212, 312 each with integrated touch sensors 113 to control the respective displays 170.

Figure 3:
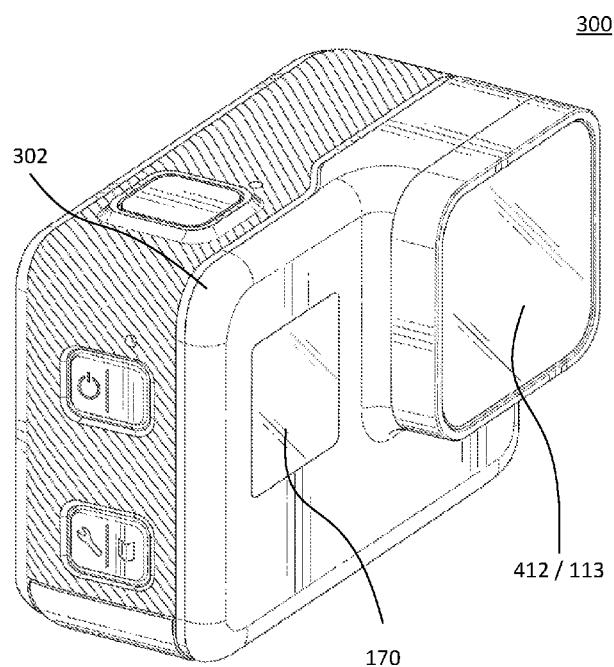
FIG. 3 is a block diagram illustrating another example embodiment of a camera having a lens assembly with an integrated touch sensor.

FIG. 3 illustrates another example embodiment of a camera 300 having a camera body 302 with a different form factor than the camera body 202 of FIGS. 2A-2B. The camera 100 of FIG. 3 includes a lens window 412 with an integrated touch sensor 113 that controls an adjacent display 170 in a manner similar to that described above.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for the described embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A camera, comprising:
 a camera body;
 an image sensor internal to the camera body for capturing images;
 a lens assembly comprising one or more lens elements to direct light to the image sensor, the one or more lens elements including a lens window on the external face of the camera body, the lens window comprising a transparent integrated touch sensor to detect a position of a touch on the lens window and to generate a touch signal indicating the position of the touch;
 a display screen on an external face of the camera body;
 a touch controller to process the touch signal and to update a display on the display screen in response to the touch signal.

2. The camera of claim 1, wherein the touch controller is configured to update a position of a cursor displayed on the display screen to correspond to the position of the touch.

3. The camera of claim 1, wherein the touch controller is configured to recognize a gesture from a sequence of touch positions encoded in the touch signal, and to update the display on the display screen in response to gesture.

4. The camera of claim 3, wherein the touch controller is further configured to update a camera control parameter in response to the gesture.

5. The camera of claim 1, wherein the display screen comprises a plurality of pixels arranged in a display matrix having a display matrix length and a display matrix width, and wherein the integrated touch sensor comprises a plurality of detectable touch coordinates arranged in a touch matrix having a touch matrix length and a touch matrix width, wherein the display matrix length is approximately equal to the touch matrix length and wherein the display matrix width is approximately equal to the touch matrix width.

6. The camera of claim 1, wherein an area of the display screen is within a range of 0.5-1.5 times an area of the lens window.

7. The camera of claim 1, wherein the lens window comprises an anti-smudge coating.

8. A camera, comprising:
 a camera body;
 a first image sensor internal to the camera body for capturing first images;
 a second image sensor internal to the camera body for capturing second images;
 a first lens assembly comprising one or more first lens elements to direct first light to the first image sensor, the one or more first lens elements including a first lens window on an first external face of the camera body;
 a second lens assembly comprising one or more second lens elements to direct second light to the second image sensor, the one or more second lens elements including a second lens window on a second external face of the camera body, a transparent touch sensor integrated with the first lens assembly, the transparent touch sensor to detect a position of a touch on the first lens window and to generate a touch signal indicating the position of the touch;

a display screen on the first external face of the camera body;

a touch controller to process the touch signal and to update a display on the display screen in response to the touch signal.

9. The camera of claim 8, wherein the touch controller is configured to update a position of a cursor displayed on the display screen to correspond to the position of the touch.

10. The camera of claim 8, wherein the touch controller is configured to recognize a gesture from a sequence of touch positions encoded in the touch signal, and to update the display on the display screen in response to gesture.

11. The camera of claim 10, wherein the touch controller is further configured to update a camera control parameter in response to the gesture.

12. The camera of claim 8, wherein the display screen comprises a plurality of pixels arranged in a display matrix having a display matrix length and a display matrix width, and wherein the integrated touch sensor comprises a plurality of detectable touch coordinates arranged in a touch matrix having a touch matrix length and a touch matrix width, wherein the display matrix length is approximately equal to the touch matrix length and wherein the display matrix width is approximately equal to the touch matrix width.

13. The camera of claim 8, wherein an area of the display screen is within a range of 0.5-1.5 times an area of the first lens window.

14. The camera of claim 8, wherein the first lens window comprises an anti-smudge coating.

15. A camera, comprising:
a camera body;
an image sensing means internal to the camera body for capturing images;

an assembly comprising one or more light-directing means for directing light to the image sensor, the one or more light-directing means including an outermost light-directing means on the external face of the camera body, the outermost light-directing means comprising a transparent integrated touch sensing means for detecting a position of a touch on the lens window and to generate a touch signal indicating the position of the touch;

a display means on an external face of the camera body for displaying content;

a touch controlling means for processing the touch signal and to update the content on the display means in response to the touch signal.

16. The camera of claim 15, wherein the touch controlling means is configured to update a position of a cursor displayed on the display means to correspond to the position of the touch.

17. The camera of claim 15, wherein the touch controlling means is configured to recognize a gesture from a sequence of touch positions encoded in the touch signal, and to update the content on the display means in response to gesture.

18. The camera of claim 15, wherein the touch controlling means is further configured to update a camera control parameter in response to the gesture.

19. The camera of claim 15, wherein the display means comprises a plurality of pixels arranged in a display matrix having a display matrix length and a display matrix width, and wherein the integrated touch sensing means comprises a plurality of detectable touch coordinates arranged in a touch matrix having a touch matrix length and a touch matrix width, wherein the display matrix length is approximately equal to the touch matrix length and wherein the display matrix width is approximately equal to the touch matrix width.

20. The camera of claim 15, wherein an area of the display means is within a range of 0.5-1.5 times an area of the outermost light-directing means.

* * * * *